United States Patent
Higuchi et al.

(10) Patent No.: US 8,711,670 B2
(45) Date of Patent: *Apr. 29, 2014

(54) BASE STATION APPARATUS AND METHOD FOR USE IN MOBILE COMMUNICATION SYSTEM

(75) Inventors: Kenichi Higuchi, Saitama (JP); Daisuke Nishikawa, Yokosuka (JP)

(73) Assignee: NTT Docomo, Inc., Tokyo (JP)

( * ) Notice: Subject to any disclaimer, the term of this patent is extended or adjusted under 35 U.S.C. 154(b) by 197 days.

This patent is subject to a terminal disclaimer.

(21) Appl. No.: 13/254,400

(22) PCT Filed: Mar. 1, 2010

(86) PCT No.: PCT/JP2010/053239
§ 371 (c)(1),
(2), (4) Date: Sep. 22, 2011

(87) PCT Pub. No.: WO2010/101111
PCT Pub. Date: Sep. 10, 2010

(65) Prior Publication Data
US 2012/0008489 A1    Jan. 12, 2012

(30) Foreign Application Priority Data
Mar. 3, 2009 (JP) ................................. 2009-049235

(51) Int. Cl.
*H04W 72/04* (2009.01)
*H04W 72/12* (2009.01)

(52) U.S. Cl.
CPC ................................. *H04W 72/1226* (2013.01)
USPC ........ 370/203; 370/328; 370/329; 455/422.1; 455/446; 455/447

(58) Field of Classification Search
None
See application file for complete search history.

(56) References Cited

U.S. PATENT DOCUMENTS 7,738,907 B2 *   6/2010   Xiao et al. ..................... 455/522
8,045,495 B2 *  10/2011   Jung et al. ..................... 370/312

(Continued)

OTHER PUBLICATIONS

Mao et al., "Adaptive Soft Frequency Reuse for Inter-cell Interference Coordination in SC-FDMA Based 3GPP LTE Uplinks", 2008, IEEE "GLOBECOM" 2008 proceedings.*

(Continued)

*Primary Examiner* — Hassan Kizou
*Assistant Examiner* — Amy Ling
(74) *Attorney, Agent, or Firm* — Osha Liang LLP

(57) ABSTRACT

One aspect of the present invention relates to a base station apparatus in a mobile communication system, comprising: an acquisition unit configured to receive an uplink signal from a user equipment and acquire channel condition information and an average value of the channel condition information for each of one or more frequency resource blocks; a reference metric calculation unit configured to calculate a reference metric indicative of priority of assignment of the frequency resource blocks to the user equipment based on the channel condition information and the average value of the channel condition information acquired by the acquisition unit; a modification unit configured to modify the reference metric calculated by the reference metric calculation unit with a first parameter to generate a modified metric; a scheduler configured to compare the modified metrics of the individual frequency resource blocks generated by the modification unit and determine an assignment plan of radio resources; and a transmitting unit configured to transmit a downlink signal in accordance with the assignment plan determined by the scheduler, wherein the modification unit modifies the reference metric with the first parameter, the first parameter having a first value for a predefined first frequency resource block and a second value for a predefined second frequency resource block if the user equipment belongs to a group differentiated based on a path loss.

6 Claims, 8 Drawing Sheets

(56) References Cited

U.S. PATENT DOCUMENTS

| | | | |
|---|---|---|---|
| 8,059,589 B2* | 11/2011 | Ji et al. | 370/329 |
| 8,249,609 B2* | 8/2012 | Katori et al. | 455/450 |
| 2008/0039129 A1* | 2/2008 | Li et al. | 455/522 |
| 2008/0186880 A1* | 8/2008 | Seki et al. | 370/281 |
| 2010/0284364 A1* | 11/2010 | You et al. | 370/330 |

OTHER PUBLICATIONS

3GPP TR 25.814 V7.1.0, Sep. 2006, "Physical layer aspects for evolved Universal Terrestrial Radio Access (UTRA)," 132 pages.

NTT DoCoMo, et al., "Downlink L1/L2 Control Signaling Channel Structure: Coding," 3GPP TSG RAN WG Meeting #47bis, R1-070103, Sorrento, Italy, Jan. 15-19, 2007, 17 pages.

3GPP TS 36.211 V8.5.0, Dec. 2008, "Physical Channels and Modulation," 82 pages.

J. Kim et al., "Frequency Reuse Power Allocation for Broadband Cellular Networks," IEICE Trans. Comm., vol. E89-B, No. 2, Feb. 2006, pp. 531-538, 8 pages.

International Search Report issued in PCT/JP2010/053239, mailed on Apr. 20, 2010, with translation, 7 pages.

Written Opinion issued in PCT/JP2010/053239, mailed on Apr. 20, 2010, 3 pages.

* cited by examiner

FIG.5

|  | RB1 | RB2 | RB3 |
|---|---|---|---|
| UE1 | 6 | 10 | 4 |
| UE2 | 4 | 1 | 7 |
| UE3 | 7 | 3 | 9 |

FIG.8
(GROUP 1)
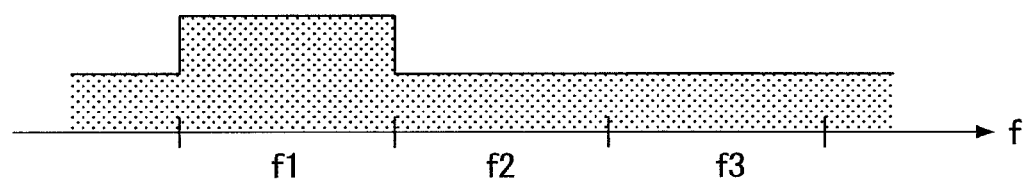
(GROUP 2)
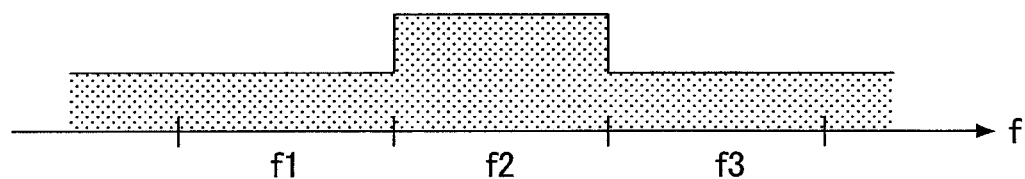
(GROUP 3)
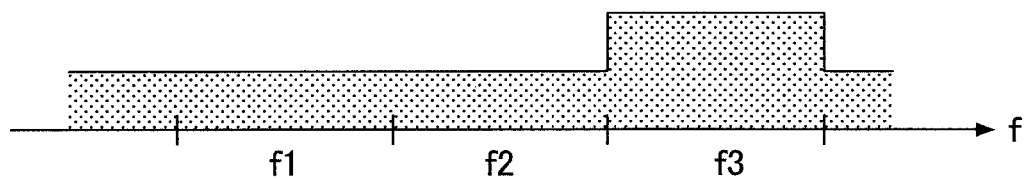

BASE STATION APPARATUS AND METHOD FOR USE IN MOBILE COMMUNICATION SYSTEM

TECHNICAL FIELD

The present invention relates to the technical field of mobile communication and particularly relates to a base station apparatus and a method for use in a mobile communication system using the next generation mobile communication technology.

BACKGROUND ART

Specification for Super 3G is defined as LTE (Long Term Evolution) by the standardization group 3GPP ($3^{rd}$ Generation Partnership Project) for W-CDMA (Wideband-Code Division Multiple Access). The Super 3G is a standard further developed from an extended technology HSPA (High Speed Packet Access) of the W-CDMA. The Super 3G realizes fast communication of higher than 100 Mbps in downlink and higher than 50 Mbps in uplink and is designed to improve latency and enhance frequency utilization.

In the LTE, an OFDMA (Orthogonal Frequency Division Multiple Access) scheme is used as a downlink radio access scheme, and a SC-FDMA (Single-Carrier Frequency Division Multiple Access) scheme is used as an uplink radio access scheme. (See non-patent document 1, for example.)

The OFDMA scheme is a multi-carrier transmission scheme where a frequency band is segmented into multiple smaller frequency bands (subcarriers) and data is carried in the individual subcarriers for transmission. The OFDMA scheme realizes fast transmission by densely arranging the subcarriers on a frequency axis orthogonally and accordingly can improve frequency utilization.

The SC-FDMA scheme is a single-carrier transmission scheme where a frequency band is segmented for individual terminals and the terminals use the different frequency bands for transmission. The SC-FDMA scheme can reduce interference between the terminals easily and effectively as well as achieve smaller variations of transmit power. Accordingly, the SC-FDMA scheme is preferred from the viewpoints of less power consumption and broader coverage for the terminals.

Furthermore, discussion of an LTE-Advanced system, which is developed from LTE, has been undertaken. The same radio access schemes are used for the LTE system and the LTE-Advanced system. Also in the LTE-Advanced system, the OFDMA scheme is used as the downlink radio access scheme.

In the LTE system and the LTE-Advanced system, one or more resource blocks (RBs) or resource units (RUs) are assigned to user equipments in downlink and uplink for communication.

In the LTE system, the downlink resource blocks are represented in a temporal domain and a frequency domain. The resource blocks are represented in a resource grid consisting of $N_{RB}^{DL}N_{SC}^{RB}$ subcarriers and $N_{symb}^{DL}$ OFDM symbols. $N_{RB}^{DL}$ denotes a downlink bandwidth represented by the multiple $N_{SC}^{RB}$s and ranges from 6 to 110 ($6 \leq N_{RB}^{DL} \leq 110$). $N_{SC}^{RB}$ denotes a resource block size of a frequency domain represented by multiple subcarriers. $N_{symb}^{DL}$ denotes the number of OFDM symbols within a downlink slot. For example, the resolution of the temporal domain may be equal to 1 ms, and the resolution of the frequency domain may be equal to 180 kHz.

Also in the LTE system, the uplink resource units are represented in a temporal domain and a frequency domain similar to the downlink. The resource units are represented in a resource grid consisting of $N_{RB}^{UL}N_{SC}^{RB}$ subcarriers and $N_{symb}^{UL}$ SC-FDMA symbols. $N_{RB}^{UL}$ denotes a uplink bandwidth represented by the multiple $N_{SC}^{RB}$s and ranges from 6 to 110 ($6 \leq N_{RB}^{UL} \leq 110$). $N_{SC}^{RB}$ denotes a resource block size of a frequency domain represented by multiple subcarriers. $N_{symb}^{UL}$ denotes the number of SC-FDMA symbols within an uplink slot. For example, the resolution of the temporal domain may be equal to 1 ms, and the resolution of the frequency domain may be equal to 180 kHz.

For convenience, the resource block and the resource unit are synonymously used, and either of them represents unit of resource assignment. The resource blocks are shared among a large number of user equipments or user apparatuses within a system. As one example, one resource block has a bandwidth of 180 kHz. For example, a system band of 5 MHz would include 25 resource blocks. A base station apparatus determines which user equipment the resource blocks are assigned to in each subframe of 1 ms in the LTE, for example. The subframe may be referred to as a TTI (Transmission Time Interval). The assignment of radio resources is referred to as scheduling.

In downlink, the base station apparatus transmits a shared channel to the selected user equipment in one or more resource blocks. The shared channel is referred to as a PDSCH (Physical Downlink Shared CHannel).

In uplink, a scheduled user equipment transmits a shared channel to the base station apparatus in one or more resource blocks. The shared channel is referred to as a PUSCH (Physical Uplink Shared Channel).

In a communication system using the shared channel, it is necessary to signal (indicate) to which user equipment the shared channel is assigned for each subframe. A control channel for use in this signaling is referred to as a PDCCH (Physical Downlink Control Channel) or a DL-L1/L2 control channel. In addition to the PDCCH, the downlink control signal may be transmitted in a PCFICH (Physical Control Format indicator Channel), a PHICH (Physical Hybrid ARQ Indicator Channel) and so on.

In the LTE and the LTE-Advanced, one-cell repetition is applied. In one-cell repetition, the same frequency channel is available in adjacent cells. In the LTE and the LTE-Advanced systems, the OFDMA scheme is used in downlink, and accordingly users are orthogonal each other in a cell. In other words, the same frequency channel is used in adjacent cells, and if a common subcarrier is used in the adjacent cells, the adjacent cells will cause interference each other. Particularly, signals that a user equipment residing in a cell edge (boundary) receives from a camped base station are susceptible to interference caused by signals transmitted from another base station adjacent to the camped base station. The interference caused by the signals transmitted from the adjacent base station would degrade throughput.

As one approach for improving the above-mentioned throughput degradation for the user residing in the cell edge, interference coordination by FFR (Fractional Frequency Reuse) is proposed.

In the FFR, a frequency available in the cell edge is reserved for each cell beforehand. In other words, in the FFR, different frequency bands for the cell edge area and the other areas are made available. In the FFR, a system band is segmented into multiple frequency bands. Different ones of the frequency bands resulting from the segmentation of the system band are assigned to user equipments residing in the cell edge area of a certain cell and user equipments residing in the cell edge area of another cell adjacent to the certain cell.

FIG. 1 illustrates one exemplary assignment of frequency bands in accordance with the FFR. In FIG. 1, the horizontal axis indicates the frequency, and the vertical axis indicates transmit power of a base station.

FIG. 1 illustrates an example of the FFR where three-cells repetition is applied to a user residing in the cell edge. In the illustrated example, the system band is segmented into three frequency bands. Hereinafter, the frequency bands resulting from the segmentation of the system band are referred to as segmented frequency bands. Frequency bands including common segmented frequency bands are assigned to user equipments residing in areas other than the respective cell edge areas of cells 1, 2 and 3. On the other hand, a segmented frequency band is assigned to user equipments residing in the cell edge areas of the cells such that the segmented frequency band cannot overlap with other segmented frequency bands for use in the cell edge areas of the adjacent cells. Furthermore, the transmit power is controlled such that higher transmit power is assigned to the user equipments residing in the cell edge area than to the user equipments residing in areas other than the cell edge area.

By assigning mutually different frequency bands to the user equipments residing in the cell edge area in the cell and the user equipments residing in the cell edge area in the adjacent cell and increasing the transmit power, the user equipments residing in the cell edge areas could avoid the inter-cell interference. The avoidance of the inter-cell interference can improve the throughput of the user equipments residing in the cell edge areas.

Meanwhile, in resource block scheduling, a metric $M_{u,f}(i)$ is calculated for each user, each resource block and each subframe, and the calculated metric values are compared. Herein, i indicates a temporal element (for example, a subframe), u indicates a user (user index), and f indicates a resource blocs (frequency). The metric is an indicator indicative of priority for assigning resource blocks to user equipments. The metric is used for purpose of scheduling at a base station apparatus. The resource blocks are assigned in priority to a user equipment having a larger metric value.

Also, a transmission format (a data modulation scheme and a channel coding rate (or a data modulation scheme and a data size)) for the assigned resource blocks is determined based on a channel condition. Generally, the metric includes a quantity indicative of the channel condition (such as SINR (Signal-to-Interference plus Noise power Ratio)) for the scheduling. Various metrics may be used depending on implementations of the scheduling. For example, a maximum CI method may be used to enhance the system throughput, and the metric $M_{u,f}(i)$ is given as follows, $$M_{u,f}(i) = \gamma_{u,f}(i).$$

The right-hand side indicates an instantaneous reception SINR at subframe i for user equipment u. For convenience, uplink scheduling is assumed. Since a user equipment having a better channel condition always communicates, the throughput could be maximized. However, fairness among users might be impaired. For this reason, a scheduling method called a PF (Proportional Fairness) method may be used.

In the PF method, the following metric is used, $$M_{u,f}(i) = \gamma_{u,f}(i)/E(\gamma_{u,f}),$$

where E means averaging. For example, E may be an average data rate and be found as a temporal average over about 100 ms to 1 second. In this case, it means that although the average may be influenced by shadowing or distance variations, influence by instantaneous fading is smoothed.

It is similar to the maximum CI method in that resource blocks are assigned to a user equipment having a greater metric $M_{u,f}(i)$. However, it differs from the maximum CI method in that an average value of reception quality for that user equipment is additionally considered. In this method, when the channel condition of individual user equipments exceeds the average channel condition of the user equipments, resource blocks are assigned. Thus, it is possible to improve the throughput as well as address unfairness caused by the maximum CI method.

RELATED ART DOCUMENT

Non-Patent Document

Non-patent document 1: 3GPP TR 25.814 (V7.1.0), "Physical Layer Aspects for Evolved UTRA", October 2006
Non-patent document 2: 3GPP R1-070103, Downlink L1/L2 Control Signaling Channel Structure: Coding
Non-patent document 3: 3GPP TS36.211 (V8.5.0), "Physical Channels and Modulation", December 2008
Non-patent document 4: J. Kim, et al., IEICE Trans. Commun., vol. E89-B, No. 2, pp. 531-538, February 2006

DISCLOSURE OF INVENTION

Problem to be Solved by the Invention

If the FFR is applied, frequency bands cannot be utilized efficiently. Specifically, in the example illustrated in FIG. 1, ⅓ of the system band is assigned to user equipments residing in the cell edge area. As a result, even if the number of user equipments residing in the cell edge area is greater than the number of user equipments residing in areas other than the cell edge area, only the ⅓ of the system band can be assigned to the user equipments residing in the cell edge area. In other words, since the frequency band available to the user equipments residing in the cell edge area is fixed, the whole frequency band cannot be utilized efficiently.

Also, a few available options of frequency assignment can decrease gain that would be obtained by frequency diversity. This is because only ⅓ of the frequency band is available for the user equipments residing in the cell edge area, while ⅔ of the frequency band is available for the user equipments residing in areas other than the cell edge area.

One object of the present invention is to realize optimal frequency resource assignment while reducing the inter-cell interference in a mobile communication system.

Means for Solving the Problem

In order to eliminate the above object, one aspect of the present invention relates to a base station apparatus in a mobile communication system, comprising: an acquisition unit configured to receive an uplink signal from a user equipment and acquire channel condition information and an average value of the channel condition information for each of one or more frequency resource blocks; a reference metric calculation unit configured to calculate a reference metric indicative of priority of assignment of the frequency resource blocks to the user equipment based on the channel condition information and the average value of the channel condition information acquired by the acquisition unit; a modification unit configured to modify the reference metric calculated by the reference metric calculation unit with a first parameter to generate a modified metric; a scheduler configured to compare the modified metrics of the individual frequency resource blocks generated by the modification unit and determine an assignment plan of radio resources; and a transmitting unit configured to transmit a downlink signal in accordance with the assignment plan determined by the scheduler, wherein the modification unit modifies the reference metric with the first parameter, the first parameter having a first value for a predefined first frequency resource block and a second value for a predefined second frequency resource block if the user equipment belongs to a group differentiated based on a path loss.

Another aspect of the present invention relates to a method for a base station apparatus in a mobile communication system, comprising: receiving an uplink signal from a user equipment and acquiring channel condition information and an average value of the channel condition information for each of one or more frequency resource blocks; calculating a reference metric indicative of priority of assignment of the frequency resource blocks to the user equipment based on the channel condition information and the average value of the channel condition information; modifying the calculated reference metric with a first parameter to generate a modified metric; comparing the modified metrics of the individual frequency resource blocks and determining an assignment plan of radio resources; and transmitting a downlink signal in accordance with the determined assignment plan, wherein the step of modifying comprises modifying the reference metric with the first parameter, the first parameter having a first value for a predefined first frequency resource block and a second value for a predefined second frequency resource block if the user equipment belongs to a group differentiated based on a path loss.

Advantage of the Invention

According to the aspects of the base station apparatus and the method as disclosed, it is possible to realize optimal frequency resource assignment while reducing the inter-cell interference in a mobile communication system.

BRIEF DESCRIPTION OF DRAWINGS

FIG. 5 illustrates an exemplary modified metric according to one embodiment of the present invention;

FIG. 8 illustrates an exemplary setting of coefficients to promote utilization of different frequencies for different path loss groups according to one embodiment of the present invention.

DETAILED DESCRIPTION OF EMBODIMENTS

Embodiments of the present invention are described below with reference to the drawings. Throughout the drawings illustrating the embodiments, the same reference symbols are attached to those having the same functions, and descriptions thereof are not repeated.

[Base Station Apparatus]

Figure 2:
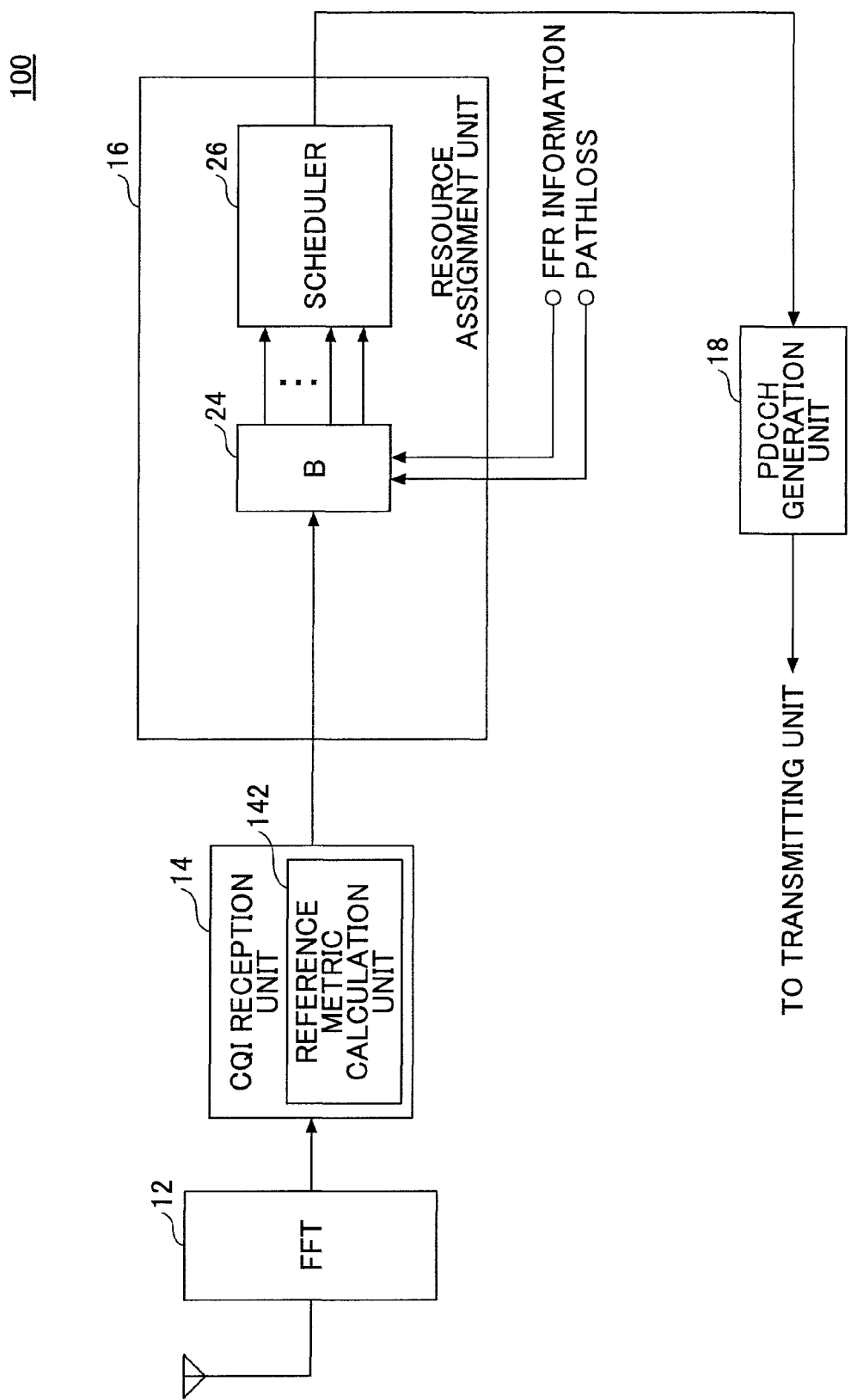
FIG. 2 is a functional block diagram illustrating a base station apparatus according to one embodiment of the present invention.

FIG. 2 illustrates a base station apparatus according to an embodiment.

A base station apparatus 100 is used in a mobile communication system where the OFDMA (Orthogonal Frequency Division Multiple Access) scheme is applied to downlink. However, the base station apparatus 100 may be used in not only the OFDMA scheme applied system but also any other system designed to realize appropriate scheduling by reducing the inter-cell interference. The present embodiment is particularly advantageous to systems where the inter-cell interference may be strongly susceptible to cell edge areas.

The base station apparatus 100 includes a fast Fourier transform (FFT) unit 12, a CQI reception unit 14, a resource assignment unit 16 and a PDCCH (Physical Downlink Control Channel) generation unit 18. The resource assignment unit 16 includes a FFR enhancement coefficient multiplication unit (B) 24 and a scheduler 26. The CQI reception unit 14 includes a reference metric calculation unit 142.

An uplink signal from a user equipment (not illustrated) is received at the base station apparatus 100 via an antenna and supplied to the FFT unit 12. The uplink signal includes downlink channel condition (CQI: Channel Quality Indicator) information and an average value of the channel condition.

The FFT unit 12 performs fast Fourier transform on the received baseband signal in order to convert the received signal into a frequency domain signal. Since the SC-FDMA scheme is used in uplink, the received uplink signal can be converted into a frequency domain to extract signals mapped into individual frequencies (resource blocks or resource units) appropriately. The FFT unit 12 supplies the frequency domain signal to the CQI reception unit 14.

The CQI reception unit 14 acquires the channel condition (CQI) information from the frequency domain signal supplied from the FFT unit 12. Also, the CQI reception unit 14 acquires an average value of the CQIs.

In the LTE system, a user equipment determines a downlink channel condition and reports the channel condition as CQI information. A determination cycle of the CQI information may be set to 2 ms at minimum. Also, the user equipment calculates an average value of the CQIs based on the CQI information. A period of calculating the average value may range from 10 ms to 1 second. Then, the user equipment reports the CQI average value together with the CQI information. The user equipment may report the CQI information regularly or periodically. Different cycles may be used for different user equipments. Also, the user equipment may transmit the CQI information in a PUCCH (Physical Uplink Control Channel) or a PUSCH (Physical Uplink Shared Channel).

The reference metric calculation unit 142 uses the CQI and the CQI average value reported from the user equipment to calculate a reference metric $P_{u,f}(i)$. The reference metric is represented as follows, $$P_{u,f}(i) = \gamma_{u,f}/E(\gamma_{u,f}) \quad (1)$$

In the formula (1), u represents an index of a user equipment, f represents a frequency block index, and i represents a time instant or subframe. Also, the CQI can be used as $\gamma_{u,f}$ and the CQI average value can be used as $E(\gamma_{u,f})$. Also, the converted CQI may be used $\gamma_{u,f}$ and the converted CQI average value may be used as $E(\gamma_{u,f})$. The conversion may be carried out by using some conversion formulae. In this embodiment, the PF (Proportional Fairness) method is utilized for the purpose of scheduling, but any other method may be utilized. Various reference metrics may be provided depending on scheduling methods. For example, in the case of the maximum CI method, the reference metric may be set as $P_{u,f}(i)=\gamma_{u,f}$.

The resource assignment unit 16 modifies (corrects) the reference metric $P_{u,f}(i)$ from the CQI reception unit 14 with a coefficient $B_{u,f}(i)$ and performs scheduling based on the modified metric $M_{u,f}(i)$. The coefficient $B_{u,f}(i)$ is described in detail below. For convenience, although a case of multiplication of the coefficient $B_{u,f}(i)$ as illustrated in formula (2) is described below, the modified metric may be represented in other forms as stated below, $$M_{u,f}(i)=B_{u,f}(i) \times P_{u,f}(i) \qquad (2).$$

The resource assignment unit 16 generates control information indicative of an assignment schedule of radio resources. The base station apparatus 100 transmits a downlink signal in accordance with the control information. Note that the resource assignment unit 16 or other means may derive the reference metric $P_{u,f}(i)$ from the measured CQI values $\gamma_{u,f}$.

The PDCCH generation unit 18 receives the control information indicative of the assignment schedule of radio resources from the resource assignment unit 16 and generates a downlink control channel. For the downlink control channel, a PDCCH (Physical Downlink Control Channel) may be used in the LTE, for example.

[First FFR Enhancement Coefficient]

The FFR enhancement coefficient multiplication unit (B) 24 generates $B_{u,f}(i)$ as one coefficient for modifying the reference metric. The FFR enhancement coefficient $B_{u,f}(i)$ may be represented as follows, $$B_{u,f}(i) = \frac{b_{u,f}}{\sum_{f=1}^{F} b_{u,f}/F} \qquad (3)$$

$$b_{u,f} = \begin{cases} \max(1, PL_u/PL_{refB}) & \text{(Predefined case)} \\ 1 & \text{(Otherwise)}. \end{cases}$$

In formula (3), u represents a user equipment, f represents a resource block, and i represents a time instant or subframe. $PL_u$ represents a path loss or a propagation loss for the user equipment u and implies distance decay effect or shadowing effect. $PL_{refB}$ is some constant value relating to the path loss and is provided as a system parameter. In general, as the user equipment is farther located away from a base station, the path loss is greater. Accordingly, $PL_u$ serves as an indicator for indicating how far the user equipment u is located away from the base station. It can be determined whether the user equipment is located away from the base station by greater than or equal to a certain distance based on comparison between $PL_u$ and $PL_{refB}$. For example, it can be determined whether the user equipment u is located in the cell edge. In the following description, a user equipment having a $PL_u$ value greater than $PL_{refB}$ is determined to be located in the cell edge. (A sufficiently large path loss for realization is set to $PL_{refB}$.) The predefined case corresponds to a case where a resource block is a predefined resource block.

As illustrated in formula (3), the FFR enhancement coefficient $B_{u,f}$ is proportional to the coefficient $b_{u,f}$. In other words, the FFR enhancement coefficient $B_{u,f}$ would result from appropriate normalization of the efficient $b_{u,f}$. The FFR enhancement coefficient $B_{u,f}$ has the substantially same property as the coefficient $b_{u,f}$. The coefficient $b_{u,f}$ is set to a value different from 1 in the predefined case and is set to 1 in the other cases. The predefined case for the coefficient $b_{u,f}$ corresponds to the case where a resource block is a predefined resource block, which does not depend on situations of subframes or scheduling. For example, letting the predefined resource block $f_B$, a user equipment residing in the cell edge is promoted to use the resource block $f_B$, and a user equipment residing in an area other than the cell edge would tend to use a resource block other than the resource block $f_B$. Such resource block assignment is conducted for individual cells. It is assumed herein that the resource blocks that the user equipment residing in the cell edge is promoted to use are mutually different between adjacent cells. In order to realize this, base stations may communicate with each other, or the system may predefine the resource blocks. Promoting the user equipment residing in the cell edge to use a predefined frequency can reduce the inter-cell interference effect.

Here, the determination as to whether the user equipment u resides in the cell edge may be made based on comparison between a path loss for the user equipment u and a reference path loss.

[Second FFR Enhancement Coefficient]

Also, the coefficient $b_{u,f}$ may be represented as follows, $$b_{u,f} = \begin{cases} \max(1, \{PL_u - PL_{refB}\}^\alpha) & \text{(Predefined case)} \\ 1 & \text{(Otherwise)}. \end{cases} \qquad (4)$$

The FFR enhancement coefficient $B_{u,f}$ is the same as formula (3). Although the coefficient $b_{u,f}$ is represented in formula (4), the FFR enhancement coefficient $B_{u,f}$ is proportional to the coefficient $b_{u,f}$. In other words, the FFR enhancement coefficient $B_{u,f}$ results from appropriate normalization of the coefficient $b_{u,f}$. The FFR enhancement coefficient $B_{u,f}$ has the substantially same property as the coefficient $b_{u,f}$. The coefficient $b_{u,f}$ is set to a value different from 1 in the predefined case and is set to 1 in the other cases. The predefined case for the coefficient $b_{u,f}$ corresponds to the case where a resource block is a predefined resource block, which does not depend on situations of subframes or scheduling. For example, letting the predefined resource block $f_B$, a user equipment residing in the cell edge is promoted to use the resource block $f_B$, and a user equipment residing in an area other than the cell edge would tend to use a resource block other than the resource block $f_B$. Formula (4) differs from formula (3) in that $PL_u/PL_{refB}$ is used in formula (3) while $(PL_u-PL_{refB})^\alpha$ is used in formula (4). By using $(PL_u-PL_{refB})^\alpha$, it is possible to encourage and discourage assigning the resource block $f_B$ to a user residing in the cell edge.

Figure 1:
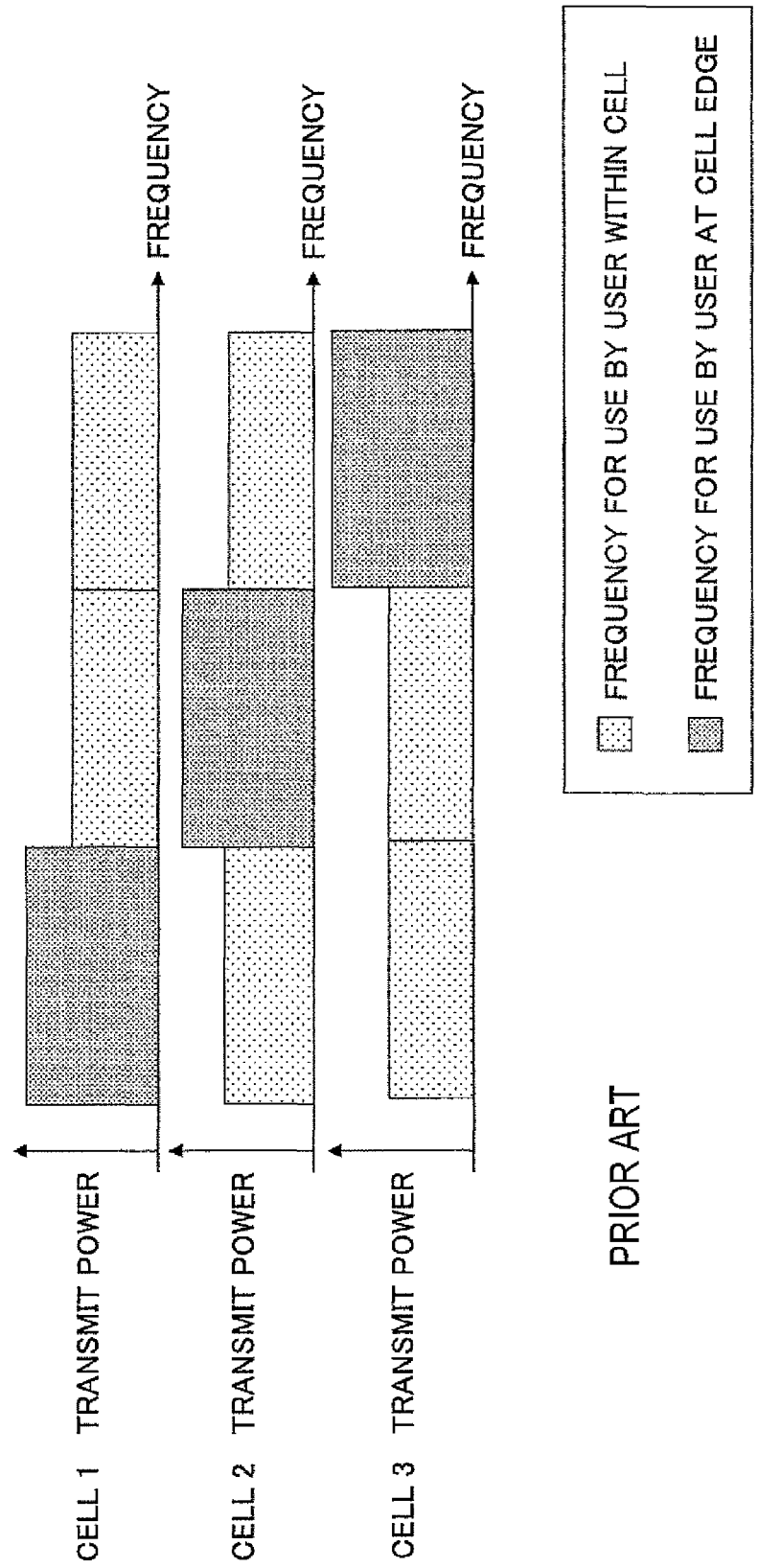
FIG. 1 illustrates a fractional frequency reuse.
Figure 3:
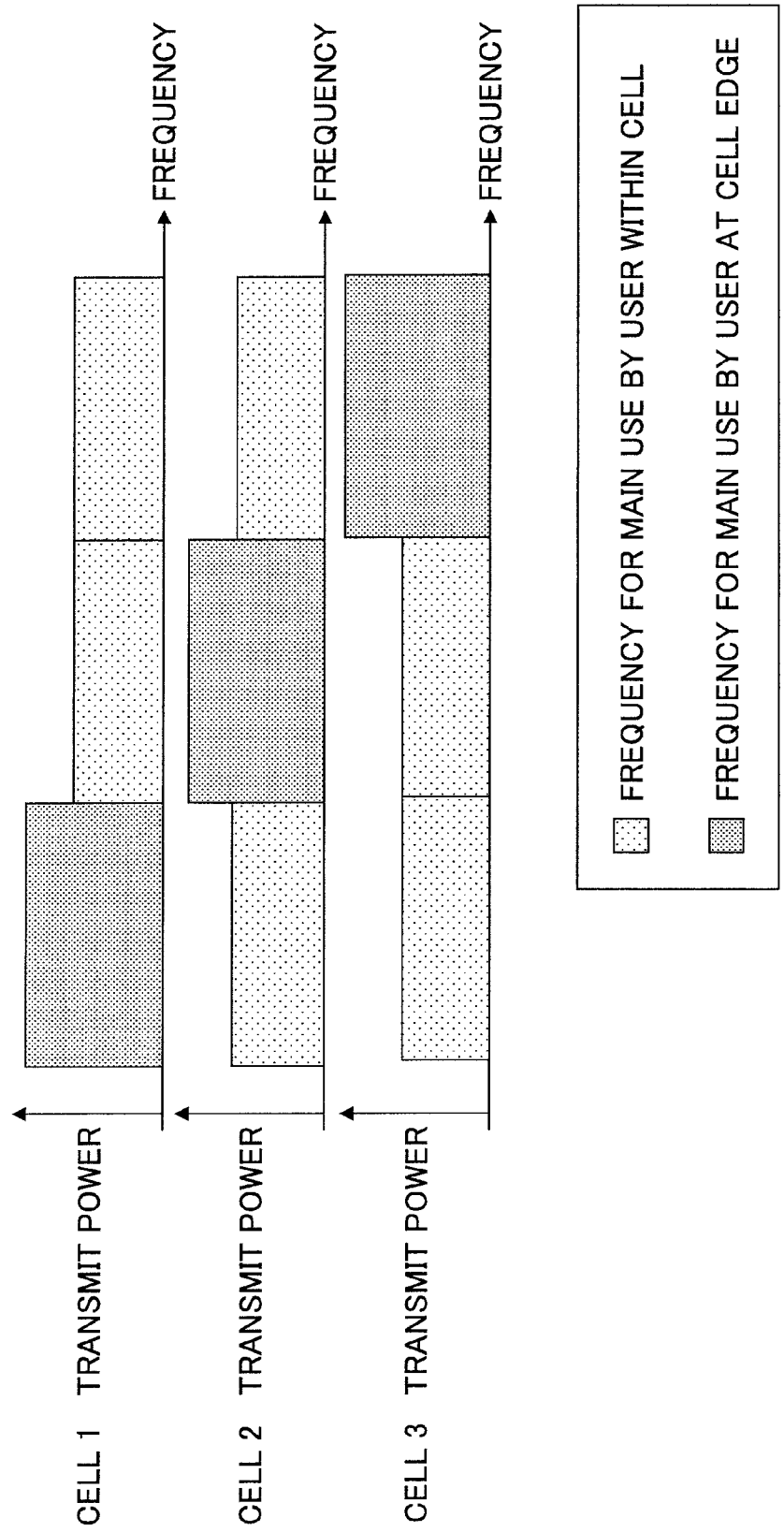
FIG. 3 illustrates exemplary assignment of frequency bands at a base station apparatus according to one embodiment of the present invention.

FIG. 3 illustrates exemplary assignment of frequency bands at the base station apparatus 100 according to one embodiment of the present invention. In FIG. 3, the horizontal axis is a frequency, and the vertical axis is transmit power. Although three-cells repetition is applied to users residing in the cell edge in FIG. 3 for simplicity, two-cells repetition or four-cells repetition may be applied. The assignment in FIG. 3 differs from the frequency band assignment in accordance with the FFR illustrated in FIG. 1 in that frequency bands available to user equipments residing in the cell edge areas are not strictly fixed. As a result, there is a chance that a frequency band other than the frequency bands assigned to the user equipments residing in the cell edge in priority can be assigned to these user equipments. Also, there is a chance that the frequency bands assigned to the user equipments residing in the cell edge in priority may be assigned to user equipments other than the user equipments residing the cell edge. Furthermore, the transmit power is controlled such that higher transmit power may be set to the user equipments to which the frequency bands to assign to the user equipments residing in the cell edge in priority have been assigned than to user equipments other than the user equipments residing in the cell edge.

The parameter α is used as a parameter indicative of weighting for assigning the predefined resource block $f_B$ to a user equipment. It is preferred that α be greater than or equal to 1. As α is set to a greater value, the metric of the frequency bands to assign to the user equipments residing in the cell edge in priority can be increased.

However, if the difference from $PL_u$ to $PL_{refB}$ is relatively large, the coefficient $b_{u,f}$ would be large through a power of α. The large coefficient $b_{u,f}$ leads to a greater metric corresponding to the user equipments residing in the cell edge and increases a chance of assigning to the user equipments residing in the cell edge. The increased chance of assigning to the user equipments residing in the cell edge may lead to unfair assignment of resource blocks between the user equipments residing in the cell edge and user equipments residing in areas other than the cell edge. In order to alleviate the unfair resource block assignment, α may be set to smaller than 1. In fact, α may be determined through simulation.

Specifically, if the path loss difference ($PL_u$-$PL_{refB}$) is large, the unfair resource block assignment may arise between the user equipments residing in the cell edge and the user equipments residing in areas other than the cell edge, and accordingly α is set to a small value. On the other hand, if the path loss difference ($PL_u$-$PL_{refB}$) is small, assignment of resource blocks to the user equipments residing in the cell edge must be promoted, and accordingly α is set to a large value. By adjusting the α value based on the path loss difference, the assignment unfairness of resource blocks between the user equipments residing in the cell edge and the user equipments residing in areas other than the cell edge can be avoided. For example, a threshold of the path loss difference is provided, and the α value may be adjusted based on the threshold.

The resource block assignment is conducted in each cell. Note that the resource blocks prompted for use in the cell edge are different for different adjacent cells. Base stations may communicate with each other beforehand, or the system may initially make determination so that the resource blocks prompted for use in the cell edge can correspond to different frequencies between adjacent cells. By promoting user equipments residing in the cell edge to utilize certain frequencies, effects by the inter-cell interference can be reduced.

The determination as to whether a user equipment u resides in the cell edge can be made based on a comparison between a path loss for that user equipment u and a reference path loss.

The FFR enhancement coefficient is not limited to the above-mentioned formulae (3) and (4). More generally, any other appropriate coefficient for modifying the reference metric may be used such that a certain resource is assigned to a certain user equipment differentiated based on the path loss. For example, by using a weight constant $B_{ref}$ for the FFR enhancement coefficient, $b_{u,f}(i)$ may be set as follows, $$b_{u,f}(i)=(PL_u/PL_{refB})^{Bref}.$$

The scheduler 26 uses the modified metric $M_{u,f}(i)=B_{u,f}(i)\times P_{u,f}(i)$ to establish a resource assignment plan. The reference metric is modified with the coefficient $B_{u,f}(i)$ as needed. In this embodiment, the resource assignment plan is determined based on comparison with the modified metric. A specific resource assignment method is described below with reference to FIG. 4.

[Exemplary Operation]

Figure 4:
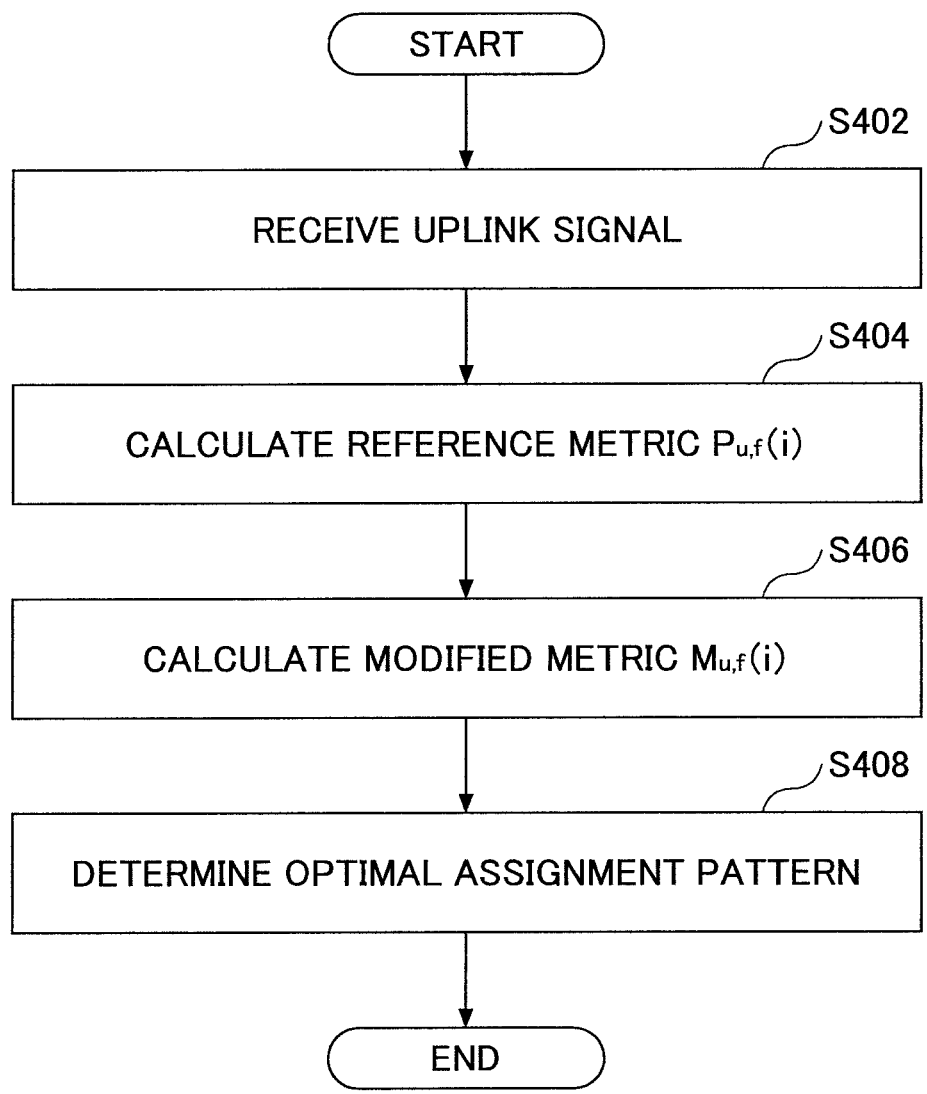
FIG. 4 is a flowchart illustrating an exemplary operation according to one embodiment of the present invention.

FIG. 4 is a flowchart illustrating an exemplary scheduling operation.

The base station apparatus 100 receives an uplink signal (step S402). The uplink signal includes CQI measurement values and an average value of the CQI measurement values. The CQI reception unit 14 acquires the CQI information and the CQI average value. The CQI reception unit 14 acquires respective CQIs for one or more resource blocks for each user. Also, the CQI reception unit 14 acquires the CQI average value.

The base station apparatus 100 calculates a reference metric (step S404). The reference metric calculation unit 142 calculates the reference metric $P_{u,f}(i)$ based on the CQI and the CQI average. The reference metric calculation unit 142 may use multiple CQI average values reported from user equipments for averaging. In this embodiment, from the viewpoint of scheduling in accordance with the proportional fairness method, the reference metric $P_{u,f}(i)$ is represented as follows, $$P_{u,f}(i)=\gamma_{u,f}(i)/E(\gamma_{u,f}) \quad (5).$$

In calculation of the reference metric $P_{u,f}(i)$, $\gamma_{u,f}(i)$ and $E(\gamma_{u,f})$ may be derived from the CQI and the CQI average value as needed. Also, the CQI may be used as $\gamma_{u,f}(i)$, and the CQI average value may be used as $E(\gamma_{u,f})$.

The base station apparatus 100 modifies the reference metric calculated at step S404 based on the predefined coefficient $B_{u,f}$ to calculate the modified metric (step S406). The modified metric is represented in formula (6). The FFR enhancement coefficient multiplication unit (B) 24 multiplies the reference metric with the FFR enhancement coefficient $B_{u,f}$, $$M_{u,f}(i)=B_{u,f}(i)\times P_{u,f}(i) \quad (6).$$

The base station apparatus 100 determines a radio resource assignment plan. The scheduler 26 assigns resource blocks to user equipments based on the modified metric supplied from the FFR enhancement coefficient multiplication unit (B) 24. In order to assign the resource blocks to a user equipment having a greater modified metric, it is preferred to take into account all possible combinations (assignment patterns) of requesting user equipments and the resource blocks. In the case where the OFDMA scheme is applied to downlink, resource blocks disposed separately in the frequency direction can be assigned to the user equipments. For each of the assignment patterns, a summation of the modified metrics is calculated, and the assignment pattern having the maximum summation is selected as the actual assignment pattern.

Figure 5:
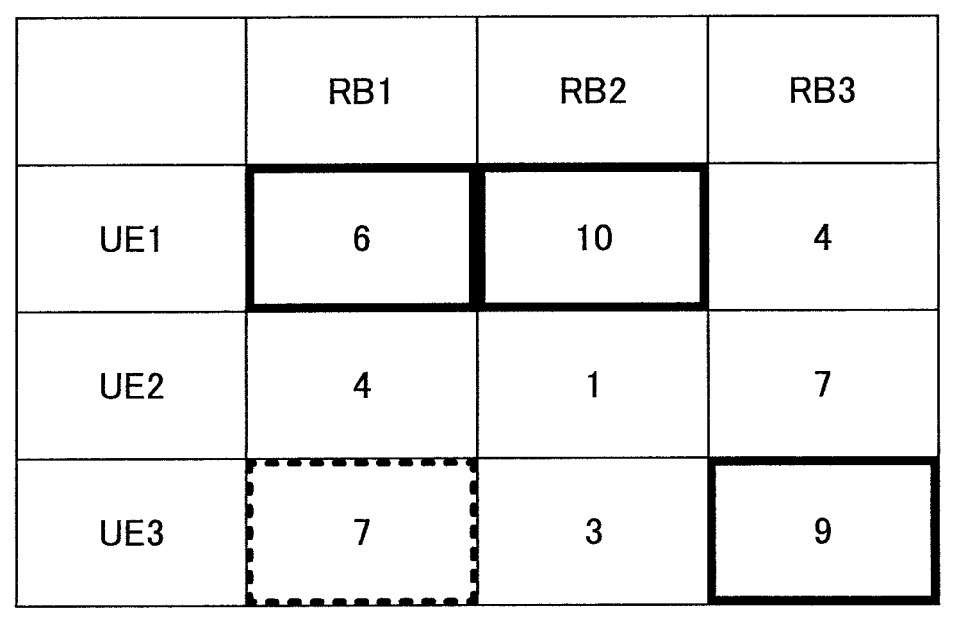

For example, the case where three resource blocks RB1, RB2 and RB3 are assigned to one or more of three users UE1, UE2 and UE3 is discussed. In this case, it is assumed that the modified metric takes values as illustrated in FIG. 5.

In the case where all the resource blocks RB1, RB2 and RB3 are assigned to user UE 1, the summation of the modified metric for this combination (assignment pattern) is equal to 6+10+4=20.

In the case where resource blocks RB1 and RB2 are assigned to user UE1 and resource block RB3 is assigned to user UE2, the summation of the modified metric for this combination (assignment pattern) is equal to 6+10+7=23.

Analogously, the summations of the modified metric are derived fro all the possible assignment patterns. The assignment pattern having the maximum summation is determined as the actual assignment pattern. According to this method, all the available assignment patterns are taken into account, and thus the truly optimal assignment pattern can be determined. However, it is not necessarily easy to take into account all the assignment patterns. If many resource blocks are assigned to a large number of users, an extremely large number of assignment patterns would be possible. From this viewpoint, a simplified method as set forth may be utilized.

Figure 6:
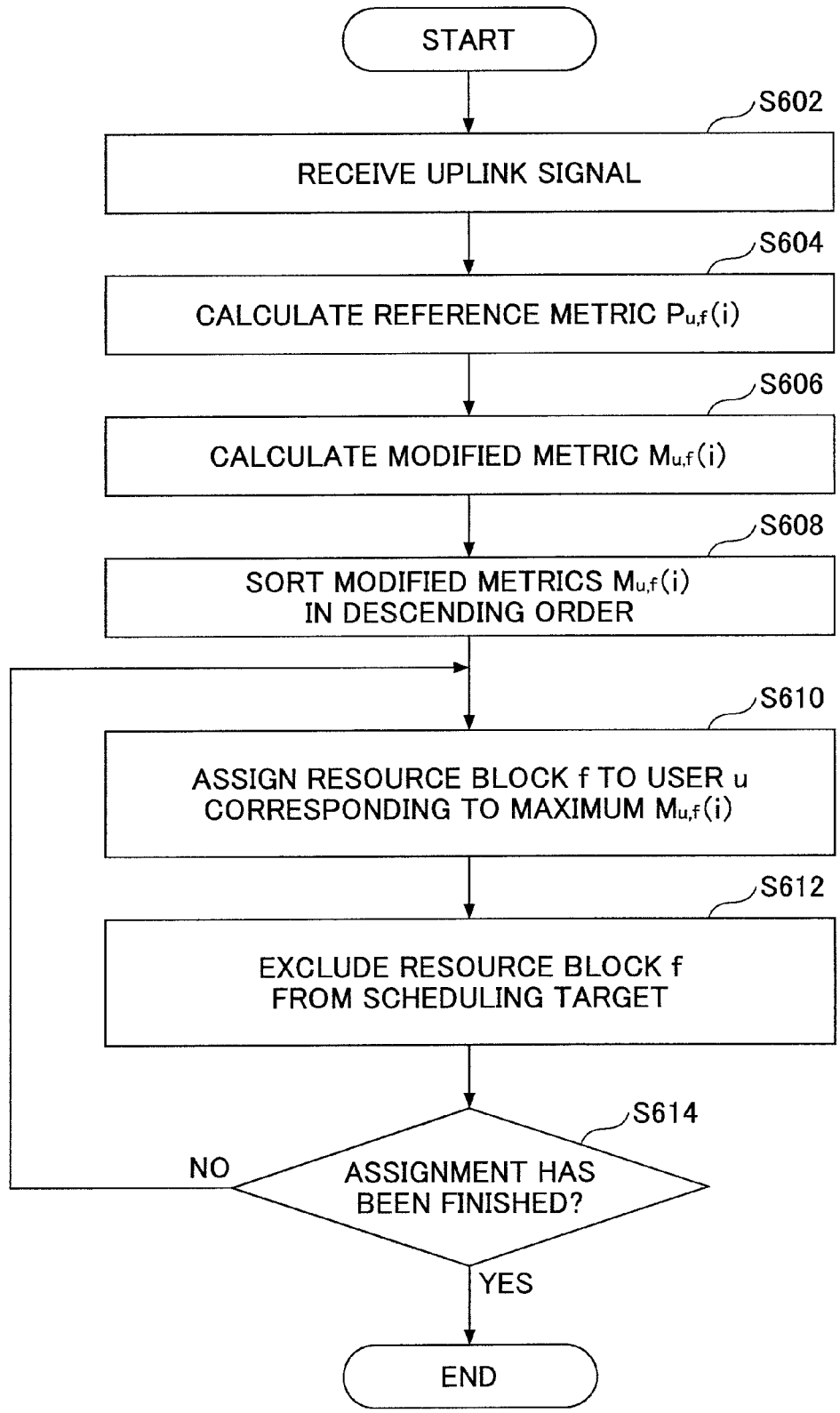
FIG. 6 is a flowchart illustrating another exemplary operation according to one embodiment of the present invention.

FIG. 6 is a flowchart illustrating another exemplary scheduling operation.

Steps S602 to S606 are the same as steps S402 to S406 described in conjunction with FIG. 4.

$$P_{u,f}(i)=\gamma_{u,f}(i)/E(\gamma_{u,f}), \text{ and}$$

$$M_{u,f}(i)=B_{u,f}(i) \times P_{u,f}(i).$$

At step S608, the modified metrics are sorted in the descending order, and a modified metric sequence $\{M_{u,f}\}$ is generated.

At step S610, a user equipment u and a resource block f corresponding to the maximum modified metric max ($\{M_{u,f}\}$) are identified. Then, the resource block f is assigned to the user equipment u. In the case where the OFDMA scheme is applied to downlink, resource blocks disposed separately in the frequency direction can be assigned to the user equipment.

At step S612, the resource block f is excluded from resource blocks to be scheduled. In this case, the modified metrics of all the user equipments associated with the already assigned resource block f are excluded from the modified metric sequence.

At step S614, it is determined whether all the resource blocks have been assigned to any of the user equipments. If there is an unassigned resource block, the flow proceeds to step S610. On the other hand, if there is no unassigned resource block, the flow is terminated.

It is assumed that the modified metrics as illustrated in FIG. 5 have been obtained. According to the method in FIG. 6, these nine modified metrics are sorted in the descending order. The maximum modified metric is equal to 10, which corresponds to UE1 and RB2. As a result, RB2 is assigned to UE1. Then, all the modified metrics associated with RB2 are excluded from the modified metric sequence. In the illustrated example, the modified metrics 10, 1 and 3 for UE1, UE2 and UE3 associated with RB2 are excluded from the modified metric sequence $\{M_{u,f}\}$. As a result, the resulting modified metric sequence includes only six modified metrics associated with RB1 and RB3.

Next, the maximum modified metrics of the six modified metrics is found. In this example, it is equal to 9, which corresponds to UE3 and RB3. As a result, RB3 is assigned to UE3. Then, all the modified metrics associated with RB3 are excluded from the modified metric sequence. In the illustrated example, the modified metrics 4, 7 and 9 for UE1, UE2 and UE3 associated with RB3 are excluded. Accordingly, the modified metric sequence includes the three modified metrics associated with RB1.

Finally, the maximum modified metric of the three modified metrics is found. In the illustrated example, it is equal to 8, which corresponds to UE3 and RB1. As a result, RB1 is assigned to UE3. In this manner, the three resource blocks are assigned to one or more users in a simple method.

[Variation]

1. Modified Metric

In the above example, the modified metric is represented in the formula where the coefficient is multiplied by the reference metric, $$M_{u,f}(i)=B_{u,f}(i) \times P_{u,f}(i).$$

However, the present invention is not limited to the formula, and any other appropriate formula may be used. This is because the reference metric only has to be modified for a certain frequency and a certain user. For example, the modified metric may include a power of the above coefficient, $$M_{u,f}(i)=P_{u,f}(i)^\alpha, \text{ and}$$

$$\alpha=B_{u,f}(i).$$

As stated above, $B_{u,f}$ is greater than 1 in the predefined case and is equal to 1 otherwise. Also, $\alpha$ is greater than 1 in the predefined case and is equal to 1 otherwise. Thus, in the predefined case, the reference metric is enhanced with $\alpha$ of greater than 1 and remains unchanged otherwise. The base $\alpha$ of power is different from $\alpha$ as mentioned above. On the other hand, the reference metric $P_{u,f}$ is calculated in accordance with the general proportional fairness method as $P_{u,f}(i)=\gamma_{u,f}(i)/E(\gamma_{u,f})$. If an instantaneous CQI value exceeds the CQI average value, the reference metric is greater than 1. On the other hand, if the instantaneous CQI value does not exceed the CQI average value, the reference metric is smaller than 1. Accordingly, if a resource for a user equipment residing in the cell edge corresponds to a predefined resource, the reference metric of greater than 1 will be enhanced such that it drastically increases compared to the case of power of 1. On the other hand, the reference metric of smaller than 1 will be enhanced such that it drastically decreases compared to the case of power of 1. As a result, the assignment of the predefined resource to the user in the predefined case will be reflected to the modified metric more strongly.

2. Coefficient Values

Figure 7:
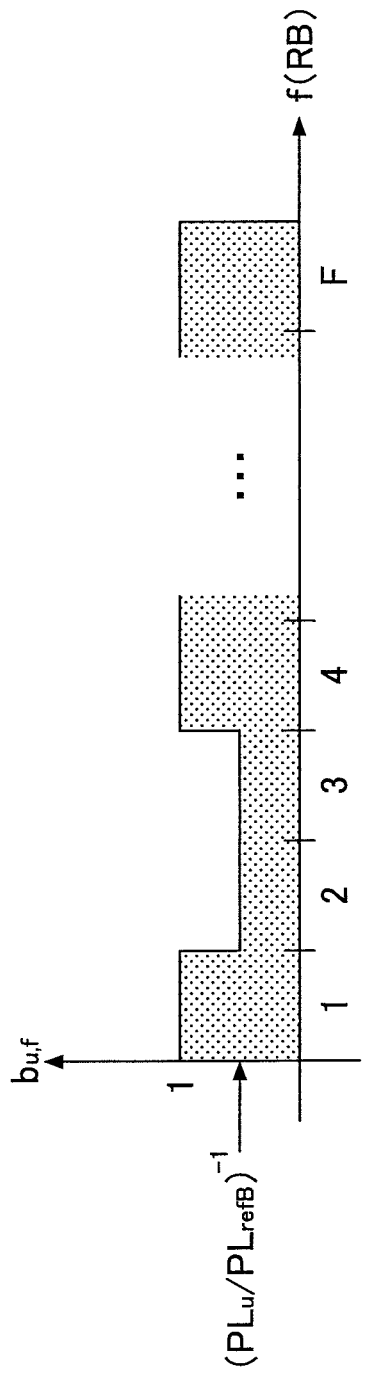
FIG. 7 illustrates an exemplary setting of coefficient values according to one embodiment of the present invention.

Possible values of the above coefficient $B_{u,f}(i)$ are determined to increase the reference metric in the predefined case. The increased modified metric promotes the user to use the resource block. On the other hand, it is conceivable that the reference metric may be modified to prevent a certain user from using a certain resource block. This is because the inter-cell interference only has to be relatively reduced in the long term. From this viewpoint, values as illustrated in FIG. 7 may be used for the coefficient for users residing in areas other than the cell edge. In the illustrated case, the coefficient has a smaller value for resource blocks 2 and 3. Even in this case, it is possible to promote a user residing in the cell edge to use resource blocks 2 and 3.

3. Grouping

A path loss value can be utilized to group users depending on the distance from a base station as well as to determine whether a user equipment resides in the cell edge. In this case, a user equipment belonging to a first group is promoted to use a first frequency, a user equipment belonging to a second group is promoted to use a second frequency, and so on. Use of different frequencies can be promoted for different groups.

FIG. 8 illustrates that coefficient values are set for different path loss groups for promotion of use of different frequencies. The first frequency $f_1$, the second frequency $f_2$ and so on correspond to one or more resource blocks. For a group of user equipments residing in the cell edge, the coefficient value is set to promote those user equipments to use a frequency different from a group of user equipments residing in the cell edge of an adjacent cell.

In conventional grouping, an available frequency is fixed for each group. In the example illustrated in FIG. 8, the frequencies are not fixed, and only utilization of a certain frequency is promoted with the coefficient for modifying the reference metric. The present method differs from the conventional method using the fixed frequencies in that the whole system band is made available depending on possible values of the modified metric.

4. Other Coefficients

In the above embodiments, the reference metric is modified with one coefficient to derive the modified metric. However, the present invention is not limited to the single coefficient, and the modified metric may be further modified from other appropriate viewpoints. For example, the modified metric may be derived as follows, $$M_{u,f}(i) = B_{u,f}(i) \times C_{u,f}(i) \times P_{u,f}(i),$$

where $C_{u,f}(i)$ is an enhancement coefficient from another viewpoint. For example, if the CQI average value E ($\gamma_f$) exceeds a predefined value, $C_{u,f}(i)$ may be set to a value greater than 1 so that it can be more likely to assign resource blocks to the user equipment.

The above embodiments are described in conjunction with downlink, but the present invention may be applied to uplink. If the present invention is applied to uplink, a base station apparatus measures uplink reception quality for each user equipment. For example, the uplink reception quality is measured based on a reference signal transmitted from the user equipment. Then, the base station apparatus uses the uplink reception quality to calculate the above-mentioned reference metric.

In this embodiment, a base station apparatus in a mobile communication system is implemented.

The base station apparatus in a mobile communication system includes an acquisition unit configured to receive an uplink signal from a user equipment and acquire channel condition information and an average value of the channel condition information for each of one or more frequency resource blocks, a reference metric calculation unit configured to calculate a reference metric indicative of priority of assignment of the frequency resource blocks to the user equipment based on the channel condition information and the average value of the channel condition information acquired by the acquisition unit, a modification unit configured to modify the reference metric calculated by the reference metric calculation unit with a first parameter to generate a modified metric, a scheduler configured to compare the modified metrics of the individual frequency resource blocks generated by the modification unit and determine an assignment plan of radio resources and a transmitting unit configured to transmit a downlink signal in accordance with the assignment plan determined by the scheduler. The modification unit modifies the reference metric with the first parameter having a first value for a predefined first frequency resource block and a second value for a predefined second frequency resource block if the user equipment belongs to a group differentiated based on a path loss.

By modifying the reference metric with the first parameter to generate the modified metric, a greater value can be set for a user residing in the cell edge in a frequency resource block assigned to that user in priority. Also, the CQI can be used to realize partial frequency repetition in consideration of instantaneous channel condition, which can realize efficient frequency assignment and improve multiuser diversity.

According to this embodiment, the first parameter $B_{u,f}(i)$ is calculated in accordance with the above formula (3), and $b_{u,f}$ is calculated in accordance with the above formula (4). In the formulae (3) and (4), u represents a user, f represents a resource block, i represents a time instant, F represents the number of resource blocks included in a system band, $PL_u$ represents a path loss of the user equipment, $PL_{refB}$ represents a predefined reference value of the path loss, and $\alpha$ represents a parameter indicative of weighting in assignment of a predefined resource block $f_B$ to the user equipment. Also, the predefined case corresponds to a case where a frequency resource block is the predefined first frequency resource block.

By setting the first parameter as illustrated in the formulae (3) and (4), the resource block assignment can be adjusted to avoid unfairness between user equipments residing in the cell edge and user equipments residing areas other than the cell edge. Since a frequency band available for the user equipments residing in the cell edge is not strictly fixed, the whole frequency band can be efficiently utilized. Also, it is possible to prevent options of frequency assignment from being narrow.

According to this embodiment, the modification unit adjusts a value of $\alpha$ based on a path loss difference between a path loss for a user equipment and a predefined reference value of the path loss.

By setting a smaller $\alpha$ value for a larger path loss difference, the unfair resource block assignment between the user equipments residing in the cell edge and the user equipments residing in areas other than the cell edge can be avoided. Also, by setting a larger a value for a smaller path loss difference, assignment of resource blocks to the user equipments residing in the cell edge can be promoted.

According to this embodiment, the modification unit decreases the value of $\alpha$ if the path loss difference is greater than or equal to a predefined threshold and increases the value of $\alpha$ if the path loss difference is smaller than the predefined threshold.

The $\alpha$ value is adjusted depending on whether the path loss difference is greater than or equal to the predefined threshold, which can avoid the unfair resource block assignment between the user equipments residing in the cell edge and the user equipments residing in areas other than the cell edge. Furthermore, the assignment of resource blocks to the user equipments residing in the cell edge can be promoted.

According to this embodiment, the modification unit calculates the modified metric by multiplying the first parameter with the reference metric.

By multiplying the reference metric with the first parameter to calculate the modified metric, a relatively large value can be assigned to a user residing in the cell edge for a resource block assigned to the user in priority.

According to this embodiment, the scheduler determines the assignment plan of radio resources in accordance with a proportional fairness method, which can alleviate the unfair resource block assignment.

The determination of the radio resource assignment plan in accordance with the proportional fairness method can reduce the resource block assignment unfairness.

Also, according to this embodiment, a method in a base station apparatus in a mobile communication system is implemented.

The method includes an acquisition step of receiving an uplink signal from a user equipment and acquiring channel condition information and an average value of the channel condition information for each of one or more frequency resource blocks, a reference metric calculation step of calculating a reference metric indicative of priority of assignment of the frequency resource blocks to the user equipment based on the channel condition information and the average value of the channel condition information, a modification step of modifying the calculated reference metric with a first parameter to generate a modified metric, a scheduling step of comparing the modified metrics of the individual frequency resource blocks and determining an assignment plan of radio resources and a transmitting step of transmitting a downlink signal in accordance with the determined assignment plan.

The step of modifying includes modifying the reference metric with the first parameter, the first parameter having a first value for a predefined first frequency resource block and a second value for a predefined second frequency resource block if the user equipment belongs to a group differentiated based on a path loss.

By modifying the reference metric with the first parameter to generate the modified metric, a relatively large value can be assigned to a user residing in the cell edge for a resource block assigned to the user in priority.

Although the present invention has been described with reference to the specific embodiments, the embodiments are simply illustrative, and various variations, modifications, alterations and replacements could be appreciated by those skilled in the art.

Specific numerals have been used in the description in order to facilitate understandings of the present invention. However, these numerals are simply illustrative, and any other appropriate value may be used.

For convenience, apparatuses according to the embodiments of the present invention have been described by using functional blocks diagrams, but the apparatuses may be implemented in hardware, software or combinations thereof.

The present invention is not limited to the above embodiments, and various variations, modifications, alterations and replacements can be included in the present invention without deviating from the sprit of the present invention.

This international patent application is based on Japanese Priority Application No. 2009-049235 filed on Mar. 3, 2009, the entire contents of which are hereby incorporated by reference.

LIST OF REFERENCE SYMBOLS

12: fast Fourier transform (FFT) unit
14: CQI (Channel Quality Indicator) reception unit
16: resource assignment unit
18: PDCCH (Physical Downlink Control Channel) generation unit
24: FFR enhancement coefficient multiplication unit (B)
26: scheduler
100: base station apparatus
142: reference metric calculation unit

The invention claimed is:

1. A base station apparatus in a mobile communication system with a processor, the processor comprising:
an acquisition unit configured to receive an uplink signal from a user equipment and acquire channel condition information and an average value of the channel condition information for each of one or more frequency resource blocks;
a reference metric calculation unit configured to calculate a reference metric indicative of priority of assignment of the frequency resource blocks to the user equipment based on the channel condition information and the average value of the channel condition information acquired by the acquisition unit;
a modification unit configured to modify the reference metric calculated by the reference metric calculation unit with a first parameter to generate a modified metric;
a scheduler configured to compare the modified metrics of the individual frequency resource blocks generated by the modification unit and determine an assignment plan of radio resources; and
a transmitting unit configured to transmit a downlink signal in accordance with the assignment plan determined by the scheduler,
wherein the modification unit modifies the reference metric with the first parameter, the first parameter having a first value for a predefined first frequency resource block and a second value for a predefined second frequency resource block if the user equipment belongs to a group differentiated based on a path loss.

2. The base station apparatus as claimed in claim 1, wherein the first parameter $B_{u,f}(i)$ is calculated as $$B_{u,f}(i) = \frac{b_{u,f}}{\sum_{f=1}^{F} b_{u,f}/F}$$

$$b_{u,f} = \begin{cases} \max(1, \{PL_u - PL_{refB}\}^\alpha) & \text{(Predefined case)} \\ 1 & \text{(Otherwise)}, \end{cases}$$

where u represents a user, f represents a resource block, i represents a time instant, F represents a number of resource blocks included in a system band, $PL_u$ represents a path loss of the user equipment, $PL_{refB}$ represents a predefined reference value of the path loss, and $\alpha$ represents a parameter indicative of weighting in assignment of a predefined resource block $f_B$ to the user equipment, and the predefined case corresponds to a case where a frequency resource block is the predefined first frequency resource block.

3. The base station apparatus as claimed in claim 2, wherein the modification unit adjusts a value of $\alpha$ based on a path loss difference between a path loss for a user equipment and a predefined reference value of the path loss.

4. The base station apparatus as claimed in claim 3, wherein the modification unit decreases the value of $\alpha$ if the path loss difference is greater than or equal to a predefined threshold and increases the value of $\alpha$ if the path loss difference is smaller than the predefined threshold.

5. The base station apparatus as claimed in claim 1, wherein the scheduler determines the assignment plan of radio resources in accordance with a proportional fairness method.

6. A method of communication for a base station apparatus in a mobile communication system, comprising:
receiving an uplink signal from a user equipment and acquiring channel condition information and an average value of the channel condition information for each of one or more frequency resource blocks;
calculating a reference metric indicative of priority of assignment of the frequency resource blocks to the user equipment based on the channel condition information and the average value of the channel condition information;
modifying the calculated reference metric with a first parameter to generate a modified metric;
comparing the modified metrics of the individual frequency resource blocks and determining an assignment plan of radio resources; and
transmitting a downlink signal in accordance with the determined assignment plan,
wherein the step of modifying comprises modifying the reference metric with the first parameter, the first parameter having a first value for a predefined first frequency resource block and a second value for a predefined second frequency resource block if the user equipment belongs to a group differentiated based on a path loss.

* * * * *